June 6, 1967 R. S. MODJESKA 3,324,014

METHOD FOR MAKING FLUSH METALLIC PATTERNS

Filed Dec. 3, 1962

INVENTOR
R. Scott Modjeska

BY
Irons, Birch, Swindler & McKie
ATTORNEYS 3,324,014

METHOD FOR MAKING FLUSH METALLIC PATTERNS

Richard Scott Modjeska, Lombard, Ill., assignor to United-Carr Incorporated, a corporation of Delaware Filed Dec. 3, 1962, Ser. No. 241,871
1 Claim. (Cl. 204—15)

This invention relates broadly to a process for producing various patterns by electroforming techniques. In a preferred embodiment, the invention relates to a process for the production of flush conductive or semi-conductive patterns of the type commonly known as "printed" circuitry, i.e., "printed" wiring or printed components such as switches, resistors, inductors and the like.

"Printed circuitry" of various types has long been known in the art, but only recently has come into widespread commercial use in the electrical and electronic industries. The "printed" circuits most widely used commercially are the so-called etched circuits of the type disclosed at least as early as 1936 in British Patents 327,356, and 461,275 and are produced by age-old graphic art techniques. These patents teach processes in which a conductive metal foil suitably is disposed on an insulatory support and a resist pattern of the desired design is applied to the metal surface in either a positive or a negative configuration. Depending upon the type of resist used, appropriate intermediate steps are undertaken, whereupon the unwanted metal foil ultimately is dissolved away by etching.

While the etched circuit has been useful in a number of electrical applications, it nevertheless has numerous inadequacies which prevent its use in many specific instances. The thin foil employed is usually from one to two thousandths of an inch in thickness and is inherently frail even when affixed to its insulating backing, so that it is subject to rupture and in some instances peeling during handling and use. A particularly irksome deficiency of ordinary etched circuitry is its surface roughness, which is accentuated by the fact that the foil edges are undercut and rendered concave by the action of the etchant. This roughness makes ordinary etched circuits unsatisfactory for use in such applications as commutators and sliding switches where contact is made and broken by a sliding stylus or switch member and an essentially flush surface on the circuit is essential to satisfactory performance.

Among the attempts to overcome such difficulties is the solution suggested in British Patent 602,492, wherein a paper sheet impregnated with thermoplastic material and containing holes where electrical contacts are to be made is pressed against the foil pattern following the etching step. As a result of this operation, the foil is partially embedded in the insulatory support under the paper; however, the uncovered regions are rough and contaminated with thermoplastic impregnating material so that the resulting structures are still inadequate for acceptable use in commutators and other switching mechanisms.

A far more successful solution to the problem is found in U.S. Patent 2,692,190. According to that process, a sheet of metal foil upon a temporary insulating support is provided with a negative resist pattern so that the exposed metal foil constitutes the desired circuit pattern. A dissimilar conductive metal is then applied by electroplating, spraying, or other suitable expedient on the surface of the exposed oil in desired conductive pattern. After removal of the resist, a thermoplastic substance which is to form the permanent support is molded around the circuit pattern and against the foil sheet. The permanent support material is then cured in situ by the use of heat and pressure, the temporary support is removed, the foil is etched away, and the dissimilar metal circuit pattern is then present, inlaid in the permanent support.

While the process of U.S. Patent 2,692,190 has been successfully employed in commercial production it does have some distinct disadvantages. Despite utmost care exercised in its manufacture, commercially available metal foil is of irregular thickness, particularly when produced by the preferred electrolytic process. Moreover, the commercially available metal foils exhibit a tendency to "buckle" when pressed against an insulatory backing. As a consequence of being pressure molded against such deformed surface, the plastic in which the electroplated circuit pattern is embedded necessarily will exhibit slight irregularities, conforming to those of the foil surface. These irregularities, while slight, nevertheless adversely affect the performance of the circuit, particularly in delicate switching applications where even minute aberrations are reflected in the performance of the device employing such circuit. Moreover, the etchant solutions employed in removing metal foil, while so selected as to be relatively inert to the dissimilar metal of the circuit pattern often do attack this dissimilar metal to some extent during the relatively long exposure period necessary to dissolve an entire foil sheet and thus cause some pitting and corrosion of the circuit pattern. Furthermore, preformed metal foil, which obviously cannot be reused, is a relatively expensive item to employ in the mass production of such circuits.

It is also known to make circuitry for commutators and other switch mechanisms by a transfer process wherein a thick layer of stainless steel, or other metal is employed as a base plate. A negative resist pattern is formed upon the surface of the plate and dissimilar metal in the form of the desired circuit pattern is then deposited, by electroplating or other suitable means, directly upon the surface of the metal plate. Plastic is molded against the plate by means of heat and pressure and the metal plate is then stripped from the surface of the plastic, leaving the circuit pattern embedded in the plastic. Such metal plates produce fairly satisfactory patterns through several cycles of use, but their surfaces become pitted and uneven, thus producing irregularities both in the surface of the circuit and in that of the permanent plastic support. Further, the plate surface becomes active, rendering the release of the pattern difficult, while heating and reheating of the plate results in warp distortion. Since preparation of the stainless steel plates is a precise and expensive proposition, such process has not enjoyed widespread use.

Accordingly, it is a primary object of this invention to provide a method for making flush metallic patterns wherein the pattern and the heat moldable material in which it is embedded are flush with each other and the entire surface has a smooth, even, regular conformation.

It is a further object of the invention to provide a method for making flush printed circuits wherein the circuit pattern and the plastic in which it is embedded are flush with each other and the entire surface has a smooth, even, regular conformation.

Another object is to provide a process for making flush printed circuitry wherein corrosion of the circuit pattern is wholly avoided because the use of an etch step is avoided.

Another object is to provide a transfer process for making flush printed circuitry which is less expensive than prior art methods and is reproducible on a mass scale within limits of tolerance approaching millionths of an inch, rather than the thousandths now achieved by the art.

A further object is to provide a transfer process for making flush printed circuitry wherein the temporary support or transfer plate is inexpensive and in any event may be reused an infinite number of times.

Still another object of this invention is to provide a transfer process for making flush metallic patterns wherein the pattern is formed by the steps of coating a smooth, highly polished surface with a very thin, conductive "parting" layer, forming a negative resist upon the surface of the layer and depositing metal upon the uncovered areas to form the circuit pattern.

A further object of the invention is to provide a transfer process for making flush printed circuitry wherein the circuit pattern or component is formed upon the surface of a conductive parting layer superimposed upon a smooth, highly polished transfer plate, the parting layer being of such negligible thickness that the heat-moldable material, when molded against this surface under heat and pressure, conforms precisely to the configuration of the transfer plate.

Another object of the invention is to provide a method for making flush printed circuitry by coating a transfer plate with a miniscule conductive parting layer upon which a negative resist pattern and a circuit pattern are directly applied, the parting layer being so selected as to be (1) not firmly bonded to the transfer plate, and (2) readily removable from the circuit surface after transfer by simple and speedy washing with a suitable solvent.

A specific object is to provide a process for making flush printed circuitry involving the use of a very thin parting layer as the surface upon which the circuit pattern is immediately formed wherein said parting layer is comprised of a conductive substance functioning as a common cathode during electrodeposition of the circuit pattern thereon.

Another specific object of the invention is to provide a process for making flush printed thin film microcircuitry wherein the parting layer is comprised of a water soluble substance which may be rendered conductive by uniformly dispersing therein a powdered conductor, the circuit is formed by vacuum deposition or electrostatic spraying upon the areas of the parting layer not previously covered by a negative resist, plastic is molded under heat and pressure against the surface so that it conforms completely to the configuration of the transfer plate underlying the parting layer, the transfer plate is physically removed and the parting layer is removed by simple washing with water.

Other and further objects will become apparent from the following detailed description of the invention.

Generally described, this invention embraces a process for making flush metallic patterns wherein a temporary support (or "transfer plate") is coated with a very thin film of a "parting" layer, a pattern is formed upon the surface of the parting layer with any suitable negative resist, metal is deposited upon the parting layer in the areas not covered by the resist, and a suitable partially cured plastic is molded against the surface and cured under heat and pressure to bond it firmly to the pattern. The transfer plate (i.e., the temporary support) is then physically removed and any parting layer adhering to the pattern surface is dissolved, so that the product thus produced is a smooth, flush, pattern embedded in the surface of a smooth, flush plastic support, the support conforming precisely to the configuration of the transfer plate.

The temporary support or transfer plate may consist of any suitable highly polished relatively hard material. Plate glass or highly polished synthetic plastic materials are particularly desirable for use as transfer plates. Certain metals such as stainless steel may in some instances be also employed, although their use is conditioned to some extent upon the nature of the parting layer to be applied to the surface, as will be hereinafter explained.

The invention contemplates the production not only of absolutely flat, flush patterns but also of curved and irregularly shaped flush patterns. Such shapes may be attained by the employment of a suitably shaped smooth, highly polished transfer member. All of the contemplated shapes may be obtained with a high degree of accuracy and reproducibility because the dimension of the parting layer intervening during molding of the permanent support between it and the transfer plate is of such negligible and insignificant dimension that the ultimate surface of the molded plastic containing the embedded flush pattern conforms absolutely—i.e., preferably within tolerance of a few millionths of an inch—to the configuration of the transfer plate.

The nature of the parting layer will depend to some extent upon the manner in which it is desired to form the pattern, the nature of the metal to be used in the pattern and the nature of the plastic to be employed in the permanent support. According to the invention, the parting layer is so selected that it will not bond firmly to the transfer plate, thus permitting easy removal of said plate from the flush pattern assembly after the molding step. The parting layer should be so selected that it readily can be dissolved from the face of the end product without deleteriously affecting the pattern, particularly where the pattern is a "printed conductor," or its insulatory backing material. Moreover, it is necessary that the parting layer be so selected as not to affect adversely the surface of the transfer plate since the invention contemplates that the transfer plate be capable of reuse.

Substances suitable for use as parting layers fall into three main categories. All of the parting layers contemplated by this invention are not preferred for making all types of patterns but in view of this specification, it will be readily apparent to one skilled in the art which parting layer will be most efficacious in any given instance.

The first main category of parting layers consists of homogeneous admixtures of powdered conductors with organic solvent soluble resins or waxes. Such an admixture is, according to the invention, applied to the surface of a transfer plate by dissolving the resin or wax carrier containing dispersed conductor powder in a suitable organic solvent and uniformly applying a very thin coating thereof by any suitable means, such as brushing, spraying, dipping, spinning, etc., over the surface of the transfer plate. Specifically, examples of suitable parting layers falling within this group are homogeneous dispersions of graphite or any finely divided metallic conductor, preferably in the form of a palpable powder, in beeswax, paraffin montan, carnauba, silicone wax, synthetic hydrocarbon wax, etc., or in an organic solvent-soluble synthetic resin such as polystyrene, atactic polyethylene, alcohol soluble polyvinyl acetate, alcohol soluble acrylic resins, partially esterified cellulose esters, halogenated hydrocarbon resins, nitrocellulose, etc.

According to further embodiment of this invention, a second main category of parting layers consists of chemically deposited or vacuum-applied films of conductive metals such as silver, copper, chromium, molybdenum, nickel, zinc, etc. Such a metal film uniformly is applied to the surface of the transfer plate in a miniscule, preferably monomolecular layer, preferably between about 1 and about 10 millionths of an inch thick. When such a metal film is employed as the parting layer, the transfer plate preferably is composed of plate glass or highly polished plastic, rather than stainless steel or aluminum or other metal. The employment of a metallic transfer plate in conjunction with a metallic parting layer is not preferred since the transfer plate surface must be subjected to passivation after every complete transfer operation to be sure that the formation of a strong bond between the metallic parting layer and the transfer plate surface is avoided. Metallic transfer plates are accordingly preferably employed in conjunction with powdered conductors dispersed in suitable readily soluble carriers, rather than with parting layers composed of metal alone.

The third main category of parting layer contemplated by this invention comprises water soluble polymers, both natural and synthetic, such as polyvinyl alcohol, polyvinyl pyrrolidone, carboxymethyl cellulose, methyl cellulose, polyacrylic acid, polyacrylamide, algin, pectin, gelatin, Irish moss, and the like, all of which are well known to the art. It will be recognized that such parting layers should not be employed when the circuit pattern is to be electrolytically deposited upon the surface of the parting layer because they will dissolve in the electroplating bath. However, such substances constitute highly desirable parting layers for the production of flush thin film microcircuitry wherein the circuits are formed by vacuum deposition or electrostatic spraying techniques.

In fashioning metallic patterns by vacuum deposition, no necessity exists for the parting layer to exhibit conductivity and hence the water soluble compound is employed alone. If the pattern is to be deposited by electrostatic spraying, however, it has been found desirable for the water soluble parting compound to contain a uniformly dispersed powdered conductor such as graphite or a powdered metal. Such a water-soluble parting layer is suitably applied to the surface of the transfer plate from aqueous solution and may be deposited by brushing, spraying, dipping, spinning, and the like.

After the application of the parting layer to the transfer plate surface, a negative resist pattern is applied to the surface of the parting layer by any suitable means known to the art. The resist preferably is applied photographically where fine definition is required, but it will be understood that all known methods of applying such a resist including contact or offset printing, silk screening, stencilling, brushing, scribing, and the like are within the scope of the invention.

After application of the resist, the exposed portions of the parting layer constitute the areas upon which the desired pattern is to be deposited. When the parting layer is either a monomolecular layer of a metal or a waxy or resinous dispersion of a powdered conductor, it is preferred that the circuit pattern will be formed by electroplating the exposed areas to the desired thickness with any desired conductive metal. In the case of a metallic film parting layer, it will be recognized that the plated metal and the parting compound should be so selected with respect to each other that they are dissimilar metals, thus minimizing formation of metallic bonds. Any known electroplating technique may be employed. As will be understood by those skilled in the art, a conductive parting layer acts as a common cathode during the plating operation so that it is possible to control the thickness of the plated pattern very accurately.

If the pattern is to be applied by vacuum deposition or by electrostatic spraying, it is contemplated that a water-soluble parting layer will be employed. Such techniques of pattern deposition are well known in the art and the invention contemplates that they be conventionally operated. The use of such techniques is particularly desirable when the end product is to be a flush thin microcircuit.

Following the deposition of the desired pattern upon the parting layer, the negative resist may be removed by any suitable means known to the art. The parting layer and the resist should be so selected with reference to each other that the solvent used to wash away the resist will not dissolve the parting layer. Such solvent, moreover, must be so selected as not to attack the circuit pattern. Although removal of the resist prior to molding is preferred in most instances, the resist may be left in place if desired. Any suitable heat-moldable backing material is molded against the surface of the circuit and the transfer plate. Partially cured plastics, such as Bakelite and other phenolic resins, alkyd resins, polyesters, nylon, urea-formaldehyde resins, epoxy resins, melamine plastics, and the like, may all suitably be employed. Ceramic compositions also are operable. This heat-moldable material is then further cured in situ by the application of heat and pressure so that it becomes securely bonded to the metallic pattern and completely conformed to the contours of the transfer plate.

After the permanent support is cured and firmly bonded to the metallic pattern, the transfer plate is physically removed from the surface of the assembly—e.g., by simple lifting. The bulk of the parting layer normally remains on the surface of the embedded pattern and is removed therefrom by appropriate cleaning. In the case of a water-soluble parting layer, simple water-washing is effective; in the case of wax or resin-carried metallic powder, the parting layer is removed by washing with an appropriate organic solvent. When the parting layer is a momomolecular metallic film, it is necessary to wash the surface with a small amount of an etching fluid. The metallic parting layer of this invention, however, is so thin that only momentary washing is needed for complete removal, and the pattern is not adversely affected. Preferably, the pattern surface then immediately is washed with water to insure that the pattern is wholly free from the deleterious corrosion observed in prior art processes which involve prolonged immersion of the entire assembly in an etching bath.

The invention contemplates that any parting layer adhering to the surface of the transfer plate be removed from it in the same manner as is used to clean the surface of the plastic-pattern assembly.

Transfer plates subjected to the process of this invention may be reused repeatedly, since their surfaces are always protected during pattern formation by the parting layer and they are not subjected to influences causing deleterious pitting, wearing or eroding. Accordingly, a high degree of reproducibility in the contours of the final flush circuit assembly is assured in economical commercial operation.

According to the invention the material deposited on the parting layer may be metal or a semi-conductor such as selenium, germanium, copper sulfide, cadmium sulfide and the like. Indeed, through selective patterning, conventional conductive and semi-conductive materials both may be employed and integrated circuits of condutive and semi-conductive elements obtained.

Referring now to the accompanying drawing, FIGURE 1 represents a transfer plate with an adhered thin film of a parting layer. Such parting layer is represented in the drawing as being of a thickness which is actually highly exaggerated in relation to its actual thickness. The invention contemplates that the parting layer shall at all times be of the thinnest possible dimension that is effective; it is often so thin as to be indiscernible to the naked eye.

Figure 1:
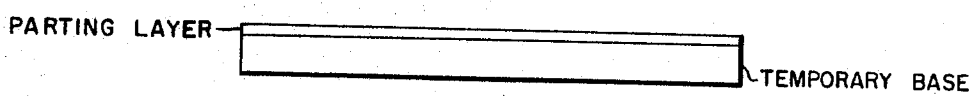
Figure 2:
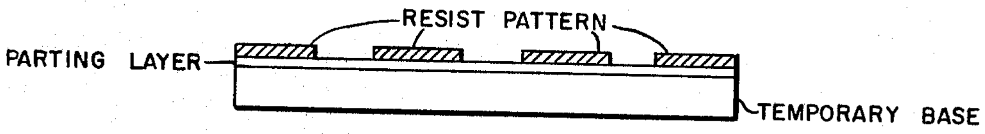
FIGURE 2 shows the coated plate of FIGURE 1 with a negative resist pattern applied to the surface of the parting layer.
Figure 3:
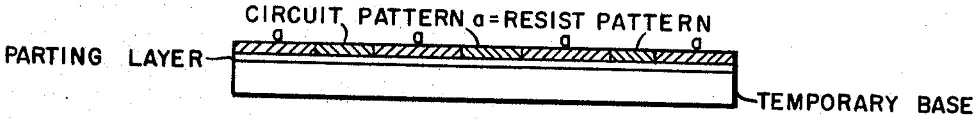
FIGURE 3 shows the same plate as FIGURE 2 with a metallic circuit pattern deposited upon the parting layer in the areas not covered by the resist. The areas denominated "*a*" represent the negative resist pattern.
Figure 4:
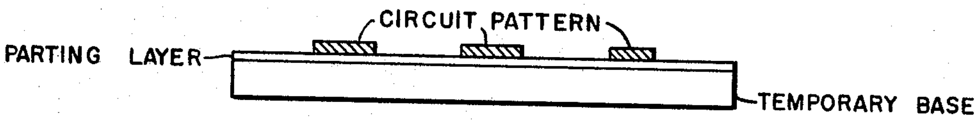

In FIGURE 4, the resist pattern has been removed, leaving the circuit pattern adhered to the coated transfer plate.

Figure 5:
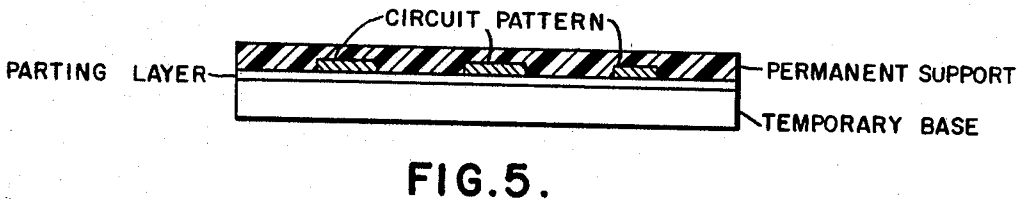

In FIGURE 5, a permanent plastic base material has been molded around the circuit pattern and against the surface of the parting layer.

Figure 6:
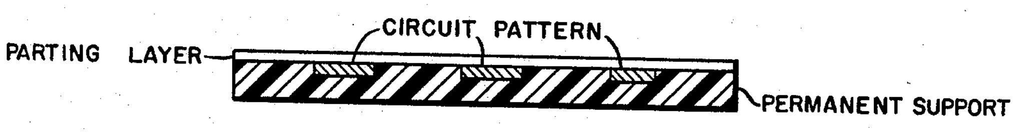

FIGURE 6 shows the circuit assembly of FIGURE 5 after the transfer plate has been removed.

Figure 7:

FIGURE 7 represents the finished flush circuit after the parting layer has been cleaned from its surface.

Having generally described the invention, the following specific examples are given by way of illustration and not of limitation:

EXAMPLE I

A sheet of plate glass 8 inches x 10 inches and ¼-inch thick was cleaned in an aqueous mixture of 200 gms. chromium oxide per liter and 100 ml. of concentrated nitric acid per liter. The glass was rinsed well in water and then sensitized in a solution containing 2 gms. stannous chloride and 10 ml. of methyl alcohol (absolute) per liter of solution. The sensitizing solution was washed from the surface in distilled water. Upon the prepared glass surface lying in horizontal plane, the following mixture was poured:

A—100:1 water; 40% formaldehyde
B—30 gms. per liter of silver nitrate complexed with ammonium hydroxide to the point where a trace of silver oxide remains undissolved A foil of silver about three microinches thick formed in about 30 seconds. After the silver foil was dried, a resist pattern in negative pattern of a desired electrical circuit was then applied to the silver surface by the conventional photographic technique employing Eastman KPR resist.

A photographic film defining the desired pattern was then placed on the dried photosensitive surface and exposed to a carbon arc lamp for one minute. The exposed surface then was developed in the normal manner by baking at 400° F. with KPR developer. The unreacted KPR coating then was washed from the silver surface. The exposed areas of the silver foil were built up to a thickness of 0.003 inch in a conventional silverplating bath. A layer of nickel then chemically was deposited on the silver to a total thickness of 0.005 inch by the Brenner Process described in the "Metal Finishing Guidebook" for 1962. The resist material then was washed away by a solvent. A heat-moldable glass-epoxy plastic composition then was molded against the pattern in a standard press.

After molding, the plastic was pulled free from the glass, with the chemically deposited silver parting layer adhering to the plastic-metal pattern sheet. This miniscule silver foil was washed from the surface of the resulting flush surface with ammonium hydroxide to which a small amount of hydrogen peroxide is added.

EXAMPLE II

A flat, highly polished plate glass sheet was provided with a miniscule layer of copper foil by means of chemical deposition. A negative resist was then photographically applied to the surface of the copper in such a manner that the uncovered areas represented a commutator circuit pattern. The copper coated glass plate with the applied negative resist was then electroplated with .001 inch of silver foil. The entire sheet then was removed from the plating bath and washed with water to remove any traces of electrolyte. The negative resist was removed in the conventional manner by washing with solvent. The entire assembly was then allowed to dry. Thereafter, partially cured bakelite sheeting was molded at a temperature of 350° F. and under a pressure of 2000 p.s.i., against the electroplated surface of the coated glass. Application of heat and pressure was continued until the plastic reached the cured state, whereupon the assembly was allowed to cool. The glass base plate was then lifted off, leaving the copper parting layer adhering lightly to the surface of the plastic circuit assembly. The surface of the assembly was briefly rinsed with aqueous ammonia to remove the miniscule copper parting layer, thus leaving a flat, smooth product consisting of the silver circuit pattern flushly embedded in the bakelite material. On examination, it was found that the flush circuit surface conformed precisely to the flat contour of the plate glass base. The flush circuit pattern was found to be ideally suitable for use as a commutator.

EXAMPLE III

Following the general procedure of Example II, a flat, polished plate glass sheet was provided with a very thin coating of finely powdered graphite uniformly dispersed in besswax. This coating was deposited by spraying on the plate a toluol solution of the wax containing the homogeneously dispersed graphite particles. The surface was tested electrically to make certain there were no breaks in the conductor film and a negative resist was applied to its surface as described in Example II. The exposed parting layer was plated to a depth of 0.004 inch with copper from a plating bath comprising copper sulfate in sulfuric acid. The plated surface was then treated as in Example II to remove the resist. Partially cured Bakelite plastic sheeting was applied to the plated surface of the glass plate in the same manner as in Example II and cooled. The plate glass transfer plate was then removed from the assembly, and the wax-graphite parting layer was removed from the circuit surface by washing with xylol. The finished product exhibited a smooth, even appearance and conformed completely to the contours of the glass transfer plate. The circuit pattern was disposed in the plastic base in flush relationship with the surface of the plastic. This assembly also was found to be eminently satisfactory for use as a commutator.

EXAMPLE IV

The general process of Example III was repeated. The parting layer was applied to the glass surface by means of a spray of finely divided graphite suspended in mineral spirits. Copper was electrolytically deposited from copper sulfate to form the conductive pattern and the copper pattern was molded by heat and pressure into a polystyrene sheet. The carbon parting layer was removed by washing in a naphtha-trichlorethylene mixture. A highly satisfactory inlaid pattern was obtained.

EXAMPLE V

A glass-epoxy resin sheet was placed in a chamber evacuated to a pressure of 2 x $10^{-5}$ inches of mercury. Powdered chromium was placed in an alundum boat in the chamber with a tungsten filament inserted as a heater into the chromium. The tungsten coil was energized by an alternating current source from a 10,000 volt transformer. The glass-epoxy sheet in the evaporation chamber became coated witha smooth, continuous, but miniscule film of metallic chromium. A resist pattern of an electrical circuit was formed by a silk screening technique. Gold was deposited on the exposed areas of the chromium film by an "electroless" gold solution. This gold was then increased in thickness, using a conventional neutral plating bath, to a thickness of 200 microinches. A partially cured phenolformaldehyde resin sheet was molded against the gold pattern under a temperature of 220 F. and at a pressure of 2500 p.s.i. The plastic sheet was physically removed and the surface chromium was washed off with dilute hydrochloric acid. An excellent, perfectly flush pattern was obtained.

While this invention has been particularly exemplified with respect to the production of commutator circuit patterns, it will be readily apparent to those skilled in the art that many other circuit mechanisms in which flush patterns of conductive or semi-conductive material are desirable can be made by the techniques described. Accordingly, it is contemplated that this invention be limited only by the scope of the appended claim.

What is claimed is:

A process for making a flush pattern which comprises the steps of:

(a) providing a highly polished smooth transfer plate,
(b) coating said transfer plate with a miniscule parting layer comprising a homogeneous admixture of a powdered conductor and an organic solvent soluble substance selected from the group consisting of waxes and resins,
(c) applying a negative resist to the surface of the parting layer to define a desired pattern on said layer,
(d) depositing by electroplating a conductive material upon the exposed areas of the parting layer in the desired pattern,
(e) molding a heat-moldable substance against the surface of the pattern under heat and pressure, (f) removing the transfer plate from the assembly so produced and, (g) removing the parting layer from the surface of the plastic-embedded pattern.

References Cited

UNITED STATES PATENTS

| | | | |
|---|---|---|---|
| 1,963,834 | 6/1934 | Decker | 204—15 |
| 2,018,471 | 10/1935 | Russel | 204—281 |
| 2,250,436 | 7/1941 | Norris | 204—281 |
| 2,874,085 | 2/1959 | Brietzke. | |
| 2,898,285 | 8/1959 | Henson | 204—297 |
| 2,961,746 | 11/1960 | Lyman | 204—15 |
| 3,181,986 | 5/1965 | Pritikin. | |

FOREIGN PATENTS

| | | |
|---|---|---|
| 792,920 | 4/1958 | Great Britain. |

JOHN H. MACK, *Primary Examiner.*

T. TUFARIELLO, *Assistant Examiner.*